UNITED STATES PATENT OFFICE.

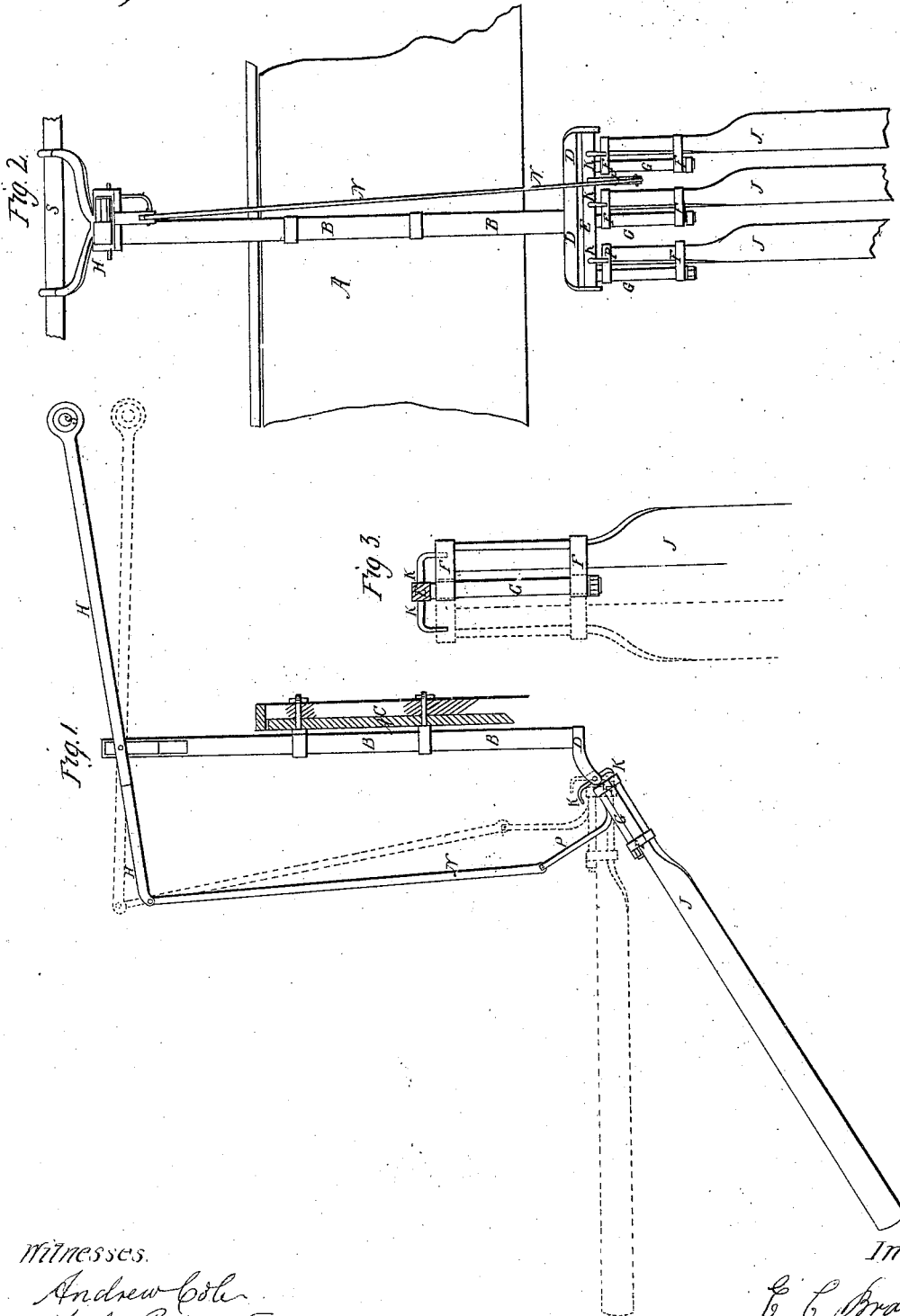

E. C. BRACKETT, OF NEWTON CORNER, MASSACHUSETTS.

IMPROVED MARINE HAND-PROPELLER.

Specification forming part of Letters Patent No. 24,368, dated June 14, 1859.

*To all whom it may concern:*

Be it known that I, E. C. BRACKETT, of Newton Corner, in the county of Middlesex and State of Massachusetts, have invented a new and Improved Hand-Propeller; and I do hereby declare that the following is a full, clear, and exact description thereof, reference being had to the accompanying drawings, and to the letters of reference marked thereon, in which—

Figure 1 represents a propeller attached to the side of a boat in a vertical position and shows the parts in two positions. Fig. 2 is a front view of the propeller, also shown attached to the side of a boat. Fig. 3 represents one of the paddles in detail, showing its lateral motion.

This invention is more particularly intended for impelling a small vessel of from ten to twelve tons, where single oars have heretofore been employed. It will be seen by the following description that the same propelling properties of the paddles or blades are preserved as when used singly, and that the number of blades may be increased or diminished, according to circumstances, still preserving the same principle of action, but limiting the effect more or less.

To enable others skilled in the art to which this invention belongs to make and use the same, I will proceed to describe its characteristics and operation as follows:

A represents a section of the side or gunwale of a boat, to which is attached at any suitable place on the side a vertical beam B, fixed to the side by screw-bolts which pass through a rib C and receive nuts on their ends for bracing the beam in a rigid position. On the lower end of this beam are fixed bent arms D D, which extend out on either side of the beam and serve as bearings for each end of a square shaft E, placed parallel to the side of the boat, to which the oar-blades J are attached by suitable hinges F F, hinged to rods G G, which are fixed to the square shaft E and have washers and nuts on their extreme ends to keep the blades from slipping off the rods. These hinges permit the blades to turn freely upon their rods G as they are alternately raised from or plunged into the water.

To effect the propulsion of the vessel and to give the necessary obliquity to the oar-blades, I fix projecting arms K to the shaft E, which project from each side of this shaft and are bent over, so that when the blades are acted upon by the impact of the water, either in their ascending or descending movement, they will come in contact with these arms and attain the requisite inclination for acting upon the water with the greatest impelling-power.

The oars are operated so as to be raised or plunged into the water by a lever H, which has its fulcrum near the top of the vertical beam B, the shorter arm of which extends out from the vessel and is pivoted to a connecting-rod N, which is carried down and pivoted to a bent arm P, fixed at right angles to the line of the oar-blades.

Two or more men can take hold of the handle S, placed on the end of lever H, and operate the oars with a greater degree of efficiency than can be done by the use of separate oars, and the movement which is given to the oars of my arrangement is somewhat upon the principle of sculling, which greatly augments the impelling properties of the oars, while at the same time the power is economically applied.

The bar B is adjustable, so that the propeller may at any time be varied or adjusted in height. This is done by shifting the position of the screw-bolts by which the bar B is attached to its rib C. This ready adjustability permits of the application of the propeller to vessels of different sizes without alteration of the parts. It also permits the convenient raising of the propeller out of the water when not required for use.

Having thus described my invention, what I claim, and desire to secure by Letters Patent, is—

The arrangement and combination of the adjustable bar B, arms D, oscillating shaft E, hinged blades F, rods G, arms K P, rod N, and lever H, as and for the purposes herein set forth and described.

E. C. BRACKETT.

Witnesses:
ANDREW COLE,
J. WESLEY BRIDGMAN.